Figure 1:
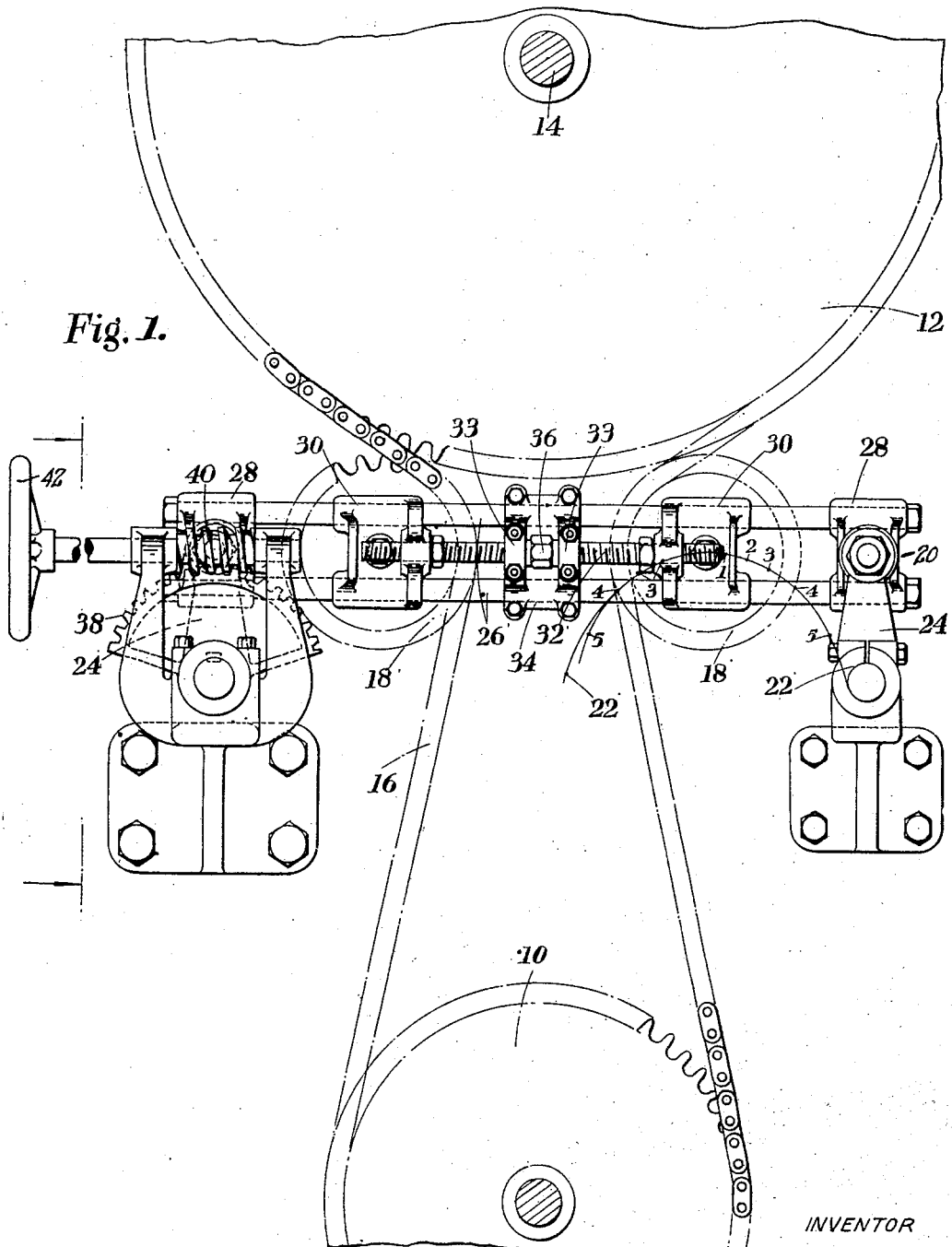

Dec. 27, 1932.  K. D. McMILLAN  1,892,067

CHAIN TRANSMISSION GEARING

Filed Oct. 17, 1930  2 Sheets-Sheet 1

INVENTOR

Kingsley Douglas McMillan

BY

ATTORNEY

Dec. 27, 1932.  K. D. McMILLAN  1,892,067
CHAIN TRANSMISSION GEARING
Filed Oct. 17, 1930   2 Sheets-Sheet 2
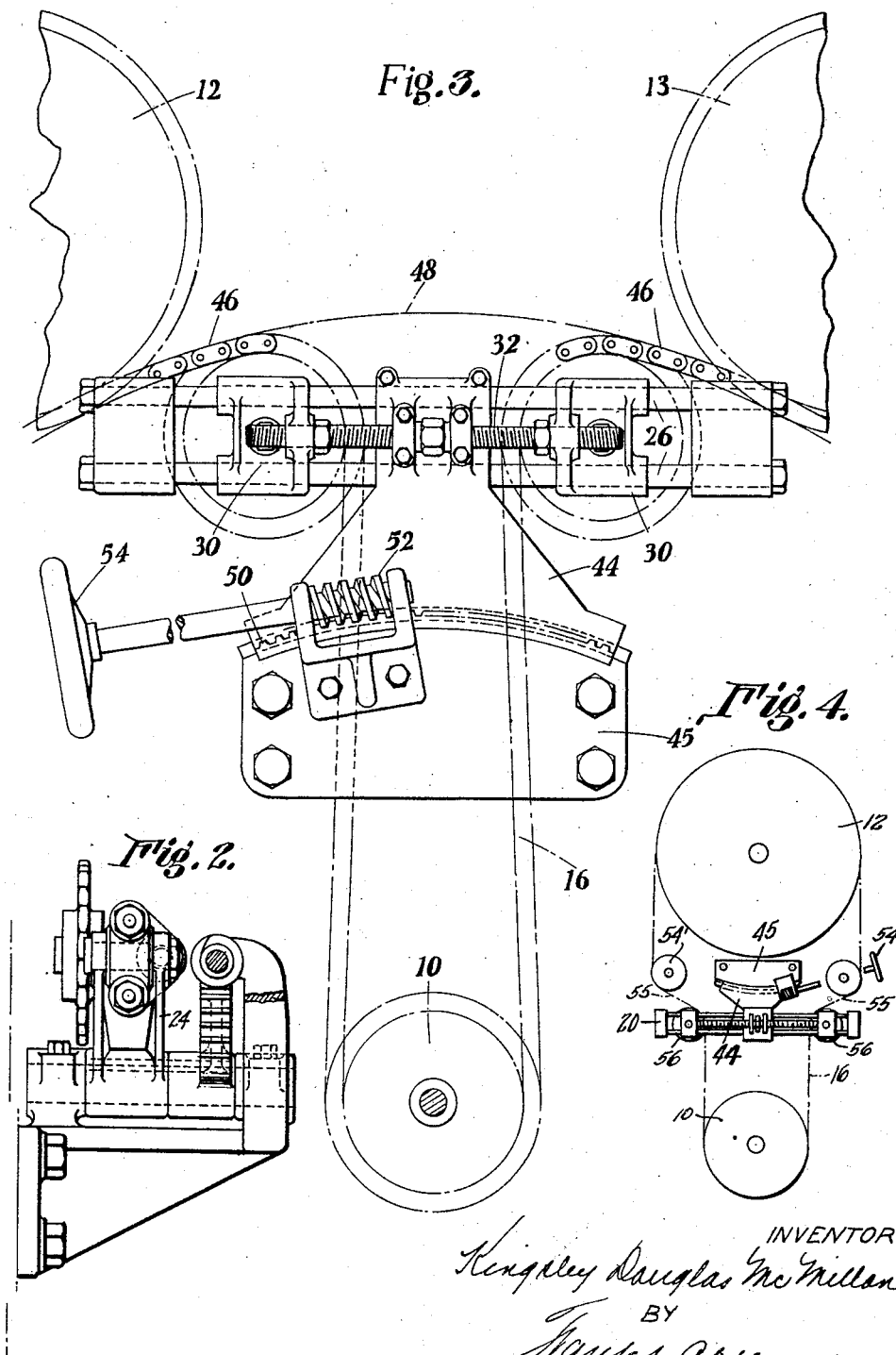
INVENTOR
Kingsley Douglas McMillan,
BY
ATTORNEY Patented Dec. 27, 1932

1,892,067

UNITED STATES PATENT OFFICE

KINGSLEY DOUGLAS McMILLAN, OF GLASGOW, SCOTLAND, ASSIGNOR TO HANS RENOLD LIMITED, OF MANCHESTER, ENGLAND, A BRITISH COMPANY

CHAIN TRANSMISSION GEARING

Application filed October 17, 1930, Serial No. 489,422, and in Great Britain November 27, 1929.

It is customary in chain transmission gearing to employ a jockey wheel movable to take up the slack in the chain, which tends to increase progressively. The use of such a jockey wheel is objectionable in certain circumstances because when it moves to take up the slack it alters the angular relation between the driving and driven wheels. Such alteration of angular relation or phase is in some cases inadmissible, for example when the driven member is a cam shaft the accurate timing of which is important as in internal combustion engines.

The invention aims at providing means for taking up the slack in chain transmission gearing without altering the angular relation between the driving and driven wheels, and for varying or adjusting such angular relation in a determinate manner without altering the tension in the chain.

According to this invention two jockey wheels are provided which both engage the same side of the chain and each engages and deflects a separate one of two free lengths of chain and these two jockey wheels are mounted on a movable carrier along which they can be moved towards and away from one another while the carrier is movable in an arcuate path such that the tension in the chain is constant whatever the position of the carrier in that path.

The two jockey wheels preferably lie wholly outside the chain and engage its outer side, thereby deflecting the two free lengths thereof inwards, but in some cases they may both be placed inside the chain, engaging its inner side and deflecting it outwards.

The invention is applicable to those cases in which there is more than one driven wheel, and may be applied either to alter the angular relation between both driven wheels and the driving wheel, or between one driven wheel only and the driving wheel.

Referring to the accompanying drawings:

Figure 1 is a front elevation of a preferred embodiment of the invention applied to a single cam-shaft drive, Figure 2 is a side view of Figure 1, Figure 3 is a front elevation of a preferred form of the invention as applied to a double cam-shaft drive, and Figure 4 is a diagram of an alternative construction in which four jockey wheels are used.

Referring first to Figure 1, the driving sprocket 10 drives the sprocket 12 on the cam-shaft 14 by means of the chain 16. Both free lengths of chain are engaged on the outside, and deflected inwards equally, by jockey wheels 18. These are shown amended on the carrier 20 which is movable in an arcuate path.

The construction shown in Figures 1 and 2 is based on the observation that if the carrier 20 of Figure 1 is moved from side to side while maintaining the chain taut, any point on the carrier will describe a path resembling a parabola concave downwardly and with its axis parallel to the line joining the centres of the two sprocket-wheels. Such a path is represented by the curve 22, Figure 1, which is the path of the centre of one of the jockey wheels. The shape of this path is very nearly independent of the distance between the centres of the jockey wheels, other things being equal, over an appreciable range, and a substantial part of the curve around its vertex is indistinguishable from a circular arc. The points marked by numerals indicate the positions of the centre of the jockey wheel corresponding to a rotation of the sprocket wheel 12 (the wheel 10 being fixed) of 1, 2, 3, . . . chain pitches. In Figures 1 and 2 the carrier is accordingly mounted on radius-arms 24 of the appropriate radius which are parallel to one another, and normally parallel to the line joining the centres of the two sprocket wheels. The carrier itself consists of two round bars 26 secured together at the ends by blocks 28 to which the upper ends of the radius-arms are pivoted. The jockey wheels 18 are carried by blocks 30 sliding on the bars 26 and moved along them by a right-and-left hand screw 32 journalled in the lugs 33 of a bracket 34 fixed to the bars at their centre. The screw has an enlarged hexagon portion 36 at its centre lying between the lugs 33 by which it may be turned and which prevents endwise movement of the screw. By turning this screw to move the jockey wheels towards one another the chain may be tightened. A worm sector 38 fixed to the spindle of one of the radius arms 24 is engaged by a worm 40, provided with a hand-wheel 42, whereby the arms may be swung in one direction or the other, thereby moving the centres of both jockey wheels over the arcuate paths indicated, these paths being the same in form though not in position whatever the positions of the jockey wheels along the bars 26. With this construction, therefore, the angular relation between the wheels can be varied without altering the chain tension, and of course it is possible to tighten the chain at any time without altering the angular relation.

Figure 3 illustrates a modified form of the invention as applied to a drive in which there are two driven sprockets 12, 13 and a single driving sprocket 10. In this modification the jockey wheels are so placed that the parts of the chain lying between them and the wheels 12 and 13 are chords of an arc having its centre at the centre of the wheel 10, and the carrier is guided to move in an arcuate path with the same centre. As will be readily understood, the tension would remain exactly constant throughout the range of adjustment if the above-mentioned parts of the chain followed the curve of the arc above-mentioned instead of being chords thereof, but the difference of length between the chord and the arc is so slight that the tension in fact remains sensibly constant.

This modified form of the invention may be carried into effect by mounting the carrier, described with reference to Figure 1 and comprising bars 26, blocks 30 and screw 32, on a central bracket 44 which slides upon an arcuate guide member 45 the centre of the guide surfaces of which is at the centre of the wheel 10, the proportions being such that the parts 46 of the chain are chords of the arc 48. The bracket carries worm teeth 50 engaged by a worm 52 provided with a hand-wheel 54, by rotating which the whole assembly of bracket, carrier and sprocket wheels may be swung about the axis of the wheel 10 in either direction.

In Figure 4 a further modified arrangement is shown in which two non-adjustable jockey wheels 54' are mounted inside the chain and two further jockey wheels 56 are mounted outside the chain. As shown, the parts 55 of the chain between the jockey wheels 54' and 56 on both sides are chords of an arc having its centre at the centre of the wheel 12, and the jockey wheels 56 are guided to move towards and away from one another along a carrier 20 exactly as described with reference to Figure 3, and the carrier is mounted on a bracket 44 which slides upon an arcuate guide member 45 the centre of the guide surfaces of which is at the centre of the wheel 12, the proportions being such that the parts 55 of the chain are chords of an arc centred at the centre of the wheel 12. The bracket carries worm teeth engaged by a worm provided with a hand-wheel as described with reference to Figure 3. It will be appreciated that for the same reasons as applied to the case of Figure 3 the movement of the carrier 20 will adjust the angular relation between the wheels 10 and 12 without disturbing the tension in the chain, while a movement of both wheels 56 towards or away from one another will alter the tension in the chain without disturbing the angular relation. It will be appreciated, of course, that the amount of movement of the jockey wheels along the carrier is small and will not, therefore, disturb appreciably the geometrical relationships described above. It will be clear that the wheels 56 might be made non-adjustable and the wheels 54' mounted as described above for adjustment.

Although the invention has been described particularly as applied to drives having a gear-ratio of 2:1, it is equally applicable to drive having other gear-ratios.

I claim:—

1. The combination with chain power-transmission gearing comprising three sprocket-wheels geared together by a single chain, of a pair of movable jockey-wheels both engaging the same side of the chain and engaging and deflecting two of the three free lengths of chain symmetrically with respect to the sprocket-wheel lying between the said two lengths, means for moving said jockey-wheels towards and away from one another and means constraining the centres of the two jockey-wheels to move together in arcuate paths centred at the centre of the aforesaid sprocket-wheel and so located that the parts of the chain lying between the jockey-wheels and the said sprocket-wheel are chords of an arc the centre of which is at the centre aforesaid.

2. The invention of claim 1 wherein the means for constraining the centres of the jockey-wheels as aforesaid comprises a carrier, two blocks each carrying one of the jockey-wheels and mounted to slide on the carrier, a right-and-left-hand screw connecting said blocks together, an arcuate guide-member for said carrier, and means for enabling the carrier to be moved at will along said guide-member.

3. The combination with chain power-transmission gearing of two jockey-wheels both engaging the same side of the chain and each engaging and deflecting a separate one of two free lengths of chain, a movable carrier for said jockey-wheels, means for moving the two jockey-wheels towards and away from one another along the carrier, and means for moving the carrier in an arcuate path such that the tension in the chain is constant at all points of said path.

4. The combination with chain power-transmission gearing of two movable jockey-wheels both engaging the same side of the chain and each engaging and deflecting a separate one of two free lengths of chain, means for moving the jockey-wheels towards and away from one another by equal amounts, and means independent of said first-mentioned means for moving both jockey-wheels in company along arcuate paths such that the tension in the chain is constant at all points of said paths.

5. The combination with chain power-transmission gearing of two jockey-wheels both engaging the same side of the chain and each engaging and deflecting a separate one of two free lengths of chain, a movable carrier for said jockey-wheels, means for moving the two jockey-wheels towards and away from one another along the carrier, and means for moving the carrier in an arcuate path while remaining parallel to itself at all points of said path.

6. The combination with chain power-transmission gearing comprising a large sprocket-wheel, a small sprocket-wheel and a chain connecting both sprocket-wheels, of two movable jockey-wheels each engaging the outer side of the chain and deflecting inwardly the two free lengths of chain at points near to the periphery of the large sprocket-wheel, the line joining the centres of the jockey-wheels being perpendicular to the line joining the centres of the sprocket-wheels, and means for moving both jockey-wheels in company in curved paths convex towards the large sprocket-wheel.

7. The combination with chain power-transmission gearing comprising a large sprocket-wheel, a small sprocket-wheel and a chain connecting both sprocket-wheels, of two movable jockey-wheels each engaging the outer side of the chain and deflecting inwardly the two free lengths of chain at points near to the periphery of the large sprocket-wheel, the line joining the centres of the jockey-wheels being perpendicular to the line joining the centres of the sprocket-wheels, and means for moving both jockey-wheels in company in non-concentric arcuate paths convex towards the large sprocket-wheel.

8. The invention of claim 3 wherein the means for moving the centres of the jockey-wheels as aforesaid comprises two blocks, each carrying one of the jockey-wheels and mounted to slide on the carrier, and a right-and-left-hand screw connecting said blocks together, and the means for moving the carrier as aforesaid comprises a plurality of parallel radius links supporting the carrier, and means for swinging the carrier from side to side under the restraint of the radius links.

9. The invention of claim 5 wherein the means for moving the carrier as aforesaid comprises two parallel radius links of equal length supporting the carrier, and means for swinging the carrier from side to side under the restraint of the radius links.

10. The combination with chain power-transmission gearing of a pair of movable jockey-wheels both engaging the same side of the chain and each engaging and deflecting a separate one of two free lengths of the chain, a second pair of jockey-wheels both engaging the side of the chain opposite to that engaged by the first pair and each deflecting a separate one of the two free lengths of chain in the direction opposite to the direction in which it is deflected by the corresponding one of the first pair, said pairs being so located that the parts of the chain lying between them are chords of an arc centred at the centre of the sprocket-wheels of the gearing, means for moving the sprocket-wheels of one pair towards and away from one another and means for moving said sprocket-wheels in company in an arcuate path also centred at the centre of the same sprocket-wheel.

11. The invention of claim 10 in which the two movable jockey-wheels are mounted movably on a movable carrier which is itself movable along the arcuate path aforesaid.

In witness whereof I hereunto subscribe my name this 30th day of September, 1930.

K. D. McMILLAN.